United States Patent [19]

Eschwey et al.

[11] Patent Number: 4,800,189

[45] Date of Patent: Jan. 24, 1989

[54] MASS FOR REMOVAL, THROUGH CHEMICAL SORPTION, OF HOMOGENEOUSLY DISSOLVED IMPURITIES, PARTICULARLY OXYGEN, FROM GASES OR LIQUIDS

[75] Inventors: Manfred Eschwey, Dusseldorf; Werner Schleser, Duisburg, both of Fed. Rep. of Germany

[73] Assignee: Messer Griesheim GmbH, Fed. Rep. of Germany

[21] Appl. No.: 54,940

[22] Filed: May 27, 1987

[30] Foreign Application Priority Data

Jun. 5, 1986 [DE] Fed. Rep. of Germany ....... 3618942

[51] Int. Cl.$^4$ .................. B01J 20/30; B01J 20/10; B01J 20/06; B01J 23/26
[52] U.S. Cl. ........................................ 502/400; 55/74; 423/219; 502/256; 502/319; 502/320; 502/407; 502/415
[58] Field of Search ............... 502/158, 256, 407, 406, 502/400, 305, 319, 320

[56] References Cited

U.S. PATENT DOCUMENTS

| | | | |
|---|---|---|---|
| 3,336,239 | 8/1967 | Bailey et al. | 502/158 |
| 3,852,406 | 12/1974 | Krauss et al. | 423/219 |
| 3,879,368 | 4/1975 | Johnson | 502/158 |

*Primary Examiner*—Paul E. Konopka
*Attorney, Agent, or Firm*—Connolly & Hutz

[57] ABSTRACT

A mass for removal through chemical sorption of oxygen and water vapor and their reactive hydrides consists of a heat-resistant oxidic carrier having a large surface area and is doped with a component that is activated with molecular oxygen at from 300° C. to 600° C. and afterwards is treated with a reducing gas at a temperature between 200° C. and below the activation temperature. Before being used as a chemical sorption agent the mass is additionally treated with a reactable gaseous hydride.

4 Claims, No Drawings

MASS FOR REMOVAL, THROUGH CHEMICAL SORPTION, OF HOMOGENEOUSLY DISSOLVED IMPURITIES, PARTICULARLY OXYGEN, FROM GASES OR LIQUIDS

BACKGROUND OF INVENTION

The invention concerns a material mass for the removal, through chemical sorption of oxygen, impurities from a gas to be purified.

Such a material mass is generally described in U.S. Pat. No. 3,852,406 ("Krauss Patent"). It can be employed with great effectiveness especially for the removal of oxygen which is present in minute traces, as for example in the preparation of high-purity gases and test gases. The operation of removing oxygen which is present in minute amounts is finding increased application in the semi-conductor industry, in which reactive hydrides are employed as process gases. Here, the purity of the process chemicals being used is of decisive significance for the yield effect which it may have on operating capacity.

The presence of oxygen in minute amounts effects, in a number of procedural stages, as e.g. in CVD (Chemical Vapor Deposition) procedures, a drastic deterioration of the electrical properties of the semi-conductor structural units, by increasing the oxygen defect density in the semi-conductor material. In the removal of the traces of oxygen found in inert cleansing and carrier gases, which are employed in large amounts in the structural member of semi-conductor manufacture, the material masses presented by the Krauss Patent has given an excellent accounting of itself. Yet, in the case of the group of reactive process gases used in semi-conductor manufacture, such as, e.g., silane, disilane, dichlorsilane, diborane, arsine, in addition to certain chelate or chelate compounds such as trimethylgallium, trimethylaluminum, trimethylindium, and corresponding ethyl compounds, no possibilities have existed up to now of a secondary cleansing in situ, i.e., at the place of consumption. The hydrides capable of reaction will react, as is known, exothermically with free hydrodroxyl groups of the oxidic carrier material within the batch. In a second, parallel-occurring reaction, the active metallic centers of the mass are reduced to a low stage of oxidation which is as yet undefined. The possibility of secondary cleansing in situ for this group of process gases and chelate compounds would be desirable inasmuch as these components are, as a general rule, centrally produced, and arrive at the actual place of consumption by way of extended supply channels. With this state of affairs, a certain contamination of the reactive process gases at one's disposal cannot be avoided.

SUMMARY OF INVENTION

The purpose therefore of the invention is to create a material mass for removing homogeneously dissolved impurities from gases, from saturated or aromatic hydrocarbons, or from ethers, through chemical sorption, which will then make possible the removal, even in minute traces, especially of oxygen, water vapor, and their reaction products with reactive hydrides even from gaseous reactive hydrides and their mixtures with inert gases.

In accordance with the invention, before being used as a chemical sorption, the mass is additionally treated with a reactable gaseous hydride at a temperature no greater than 200° C.

DETAILED DESCRIPTION

The invention is concerned with the type of material masses disclosed in the Krauss Patent. Such a mass is transformed into an especially active state with the aid of a reactive hydride such as, e.g., monosilane, disilane, halogensilane, arsine, phosphine, diborane, etc. The active centers of the original contact or contact, which in most cases means a coordinatively unsaturated metallic ion that is bonded by means of oxygen "bridges", are reduced further by this procedure. The especially reactive conditions of oxidation which have resulted at the metallic centers have not been susceptible to more precise definition up to this time. This second stage of reduction causes such a contact mass to be suited to an effective secondary cleansing or chelate of reactive hydrides and of organometallic compounds, such as they are used in the manufacture of semi-conductors. The capacity for oxygen absorption is increased drastically by the second stage of reduction, compared to the situation of the untreated contact.

These hydride-reduced absorbent masses, in conformity with the procedure of the invention, may of course be employed not just for after-cleansing of reactive gases, or of their mixtures with inert gases, but they are adapted also for the after-cleansing of, e.g., inert gases, hydrogen, and nitrogen. The contacts act as effective polymerization catalysts for unsaturated hydrocarbons. Saturated hydrocarbons and other carbon compounds appearing in process gases, and which are as disturbing as oxygen especially in the manufacture of semi-conductors, may be bonded or removed with the mass, according to the invention, in as low as extremely minute traces.

The following is an example, for the manufacture of the mass, according to the invention.

A mass is produced which conforms to the Krauss Patent. Next, an oxidic carrier, such as aluminum oxide or silicon dioxide, is saturated with an aqueous chromic acid solution, so that the impregnated, air-dried carrier contains the chromium component in a concentration of 1–10% by weight. Any larger or smaller amounts of course could be also be used. Next, the mass is drawn off into a column, and placed into a tube furnace. The furnace makes possible a heating of the entire height of the mass-heap in the column. The column is equipped with a connective conduit for supplying of the desired gases, so that these will be able to penetrate thoroughly the column.

The heaped mass is then dried, and then activated with molecular oxygen at raised temperatures. Then, air is admitted through the mass, at from 300° C. to 600° C. After the activation, the chromium will exist as surface compounds within high stages of oxidation, upon the oxidic carrier. $Cr^{6+}$ comes thus into existence where the metal is chromium.

After this period of activation, the batch is treated at 250° C. with carbon monoxide. This reduces the oxygen-bonded chromium to the very reactive oxidation stage of +2. The mass now exists as prescribed by the Krauss Patent.

After complete expulsion of the carbon monoxide by cleansing with nitrogen, there follows the procedure according to the invention, that of treating the batch with a reactable hydrodride, monosilane, by way of the example. The reaction of the contacts with the silane should be regulated, e.g., by dilution with nitrogen, so that the temperature does not exceed 200° C. The progress of the reaction may be followed by measuring the temperature along the absorbent pile. In the example using silane for the reduction the reaction may be visually followed; thus, one may observe that, in the absorbent masses which contain chromium and which prior to treatment with silane are colored blue, the contact after the treatment is colored grayish-black. During the course of this exothermic reaction, hydrogen is formed, which is expelled after completion of the monosilane treatment by cleansing thoroughly with an inert gas, leaving the now usable hydride-reduced absorbent mass.

All the stages necessary for the preparation of the absorbent masses of the invention may be carried out under normal pressure. However, no disadvantage attaches to the existence of stages with higher pressure. The after-cleansing procedure of the gas just described can operate, as known through experience, across a very wide range of both temperature and pressure, from $-200°$ C. to $+600°$ C., and from 1 to 300 bar. Inside of this wide area, the appropriately expedient degree of temperature or stage of pressure can be selected for each individual case. In many cases it is especially to one's advantage to operate at room temperature, since then there is no need for supplying heat or cooling.

The effectiveness of the absorbent masses in accordance with the present invention for efficient removal of oxygen and its compounds from streams of gas which contain reactable hydrides could be demonstrated by bringing into play highly sensitive gas-chromatographic and mass-spectroscopic methods. Thus, the oxygen content and the content of water vapor in variously treated gas streams would lie beneath the momentary analytical detection limit of 0.01 ppm for $O_2$, or beneath 0.1 ppm for water vapor. As demonstration of the efficiency according to the invention of the hydride-reduced absorbent masses, a defined amount of monosilane was mixed together with a flow of helium containing 5 ppm of water vapor and 2.0 ppm of oxygen, so that there emerged a homogeneous mixture which ranged from 1% to 5% of monosilane by volume. Immediately thereafter, the gas mixture was run through an absorbent pile which consisted of a silane-reduced contact mass with 4.5% by weight of chromium on silicon dioxide, prepared by treating with the hydride at temperatures up to a maximum of 200° C. Upon conclusion of the contact, the oxygen and hydrogen vapor content of the silane/helium gas mixture lay, in all areas of concentration, beneath the momentary analytical detection limit of 0.01 ppm for $O_2$, and 0.1 vpm for water vapor. In addition, it could be demonstrated by mass-spectrometer or gas-chromatograph that, under these circumstances, no reaction products of the monosilane with oxygen or water vapor as, e.g., silicon dioxide, disiloxane, and hydrogen, are likewise formed.

The following control experiment demonstrates the increase of oxygen absorption capacity.

A mass which was produced according to the Krauss Patent containing 3% chromium (by weight) on silicon dioxide, was activated with monosilane at 70° C.–200° C., in a second reduction stage. The contact was supplied with helium which contained 1% oxygen by volume, in order to determine the oxygen absorption capacity. The pressure of the oxygen was detected using a commercial oxygen detection meter. The untreated mass served as the control:

| Absorbed amount per kg | $SiH_4(g)$ | $O_2(g)$ |
|---|---|---|
| Catalyst mass: 3 wt. % Cr on silicon dioxide | — | 15.7 |
| The same mass reduced according to the invention with silane | 118 | 120.9 |

The oxygen absorption capacity increased through application of the invention derived treatment, as opposed to the untreated mass, by around 769%.

SUMMARY

Homogeneously dissolved impurities, particularly oxygen in minute traces, may be removed from gases through chemical sorption by bringing the gases into contact with a mass, whose composition consists of a heat-resistant oxidic carrier with a large surface area which has been doped with an active iron, nickel, rhenium, titanium, manganese, vanadium, molybdenum, and/or chromium containing component. This mass is activated with molecular oxygen, and then treated with a reducing gas. However, this mass is incapable of removing oxygen from reactive hydrides. In order to make this possible, the mass has to be treated in addition with a reactable gaseous hydride at temperatures of up to a maximum of 200° C. This mass may also be employed in the usual manner for the removal of other homogeneously dissolved impurities from gases.

What is claimed is:

1. In a procedure for producing a chromium-containing mass usable for removing oxygen impurities by chemical sorption from a gas to be purified wherein the mass is formed by applying chromium to an oxidic carrier, then activating the carrier with oxygen at an elevated temperature and then subjecting the activated carrier to a reduction step by treatment with a reducing gas before bringing the mass into contact with the gas to be purified, the improvement being in subjecting the activated carrier to a second stage of reduction by treatment with a reactive process gas selected from the group consisting of monosilane, disilane, halogensilane, dichlorosilane, diborane, arsine, phosphine, trimethylgallium, trimethylaluminum, trimethylindium, ethylgallium, ethylaluminum, and trimethylindium and mixtures there-of with inert gases whereby the mass is capable of removing oxygen in amounts as low as trace amounts from the gas to be purified including a reactive process gas containing oxygen impurities as well as from a gas selected from the group consisting of nitrous oxide, hydrogen halides, hydrogen sulfide, sulfur dioxide, ammonia, carbon dioxide, and saturated and aromatic hydrocarbons and ether.

2. The procedure of claim 1, characterized by the fact that the second stage of reduction takes place at a temperature up to a maximum of 200° C.

3. The procedure of claim 2, characterized by the fact that during the second stage of reduction the reactive process gas is diluted with nitrogen.

4. The procedure of claim 1, characterized by the fact that the reactive process gas used in the second stage of reduction is monosilane.

* * * * *